US011275477B2

(12) United States Patent
Hashida et al.

(10) Patent No.: US 11,275,477 B2
(45) Date of Patent: Mar. 15, 2022

(54) INPUT DEVICE

(71) Applicant: Alps Alpine Co., Ltd., Tokyo (JP)

(72) Inventors: Junji Hashida, Niigata-ken (JP); Toru Takahashi, Niigata-ken (JP); Toru Sawada, Niigata-ken (JP); Yoshifumi Masumoto, Niigata-ken (JP); Shinichi Higuchi, Niigata-ken (JP); Koji Tsukamoto, Niigata-ken (JP); Tomoyuki Yamai, Niigata-ken (JP); Akihiro Takeda, Niigata-ken (JP); Sadakazu Shiga, Niigata-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/308,811

(22) Filed: May 5, 2021

(65) Prior Publication Data

US 2021/0255739 A1      Aug. 19, 2021

Related U.S. Application Data

(63) Continuation of application No. PCT/JP2019/046986, filed on Dec. 2, 2019.

(30) Foreign Application Priority Data

Dec. 17, 2018  (JP) .............................. JP2018-235638

(51) Int. Cl.
   *G06F 3/044*  (2006.01)
   *G06F 3/041*  (2006.01)
(52) U.S. Cl.
   CPC .......... *G06F 3/0446* (2019.05); *G06F 3/0412* (2013.01)

(58) Field of Classification Search
   CPC ............................ G06F 3/0412; G06F 3/0446
   See application file for complete search history.

(56) References Cited

U.S. PATENT DOCUMENTS

2004/0243747 A1    12/2004  Rekimoto
2010/0108409 A1     5/2010  Tanaka et al.
(Continued)

FOREIGN PATENT DOCUMENTS

JP    2002-342033    11/2002
JP    2012-003554     1/2012
(Continued)

OTHER PUBLICATIONS

International Search Report from International Application No. PCT/JP2019/046986 dated Jan. 7, 2020.

*Primary Examiner* — Peter D McLoone
(74) *Attorney, Agent, or Firm* — Beyer Law Group LLP

(57) ABSTRACT

In an input device capable of reliably detecting, when an operator brings an operating body close to or into contact with an operation plane, absolute position information irrespective of a contact area size, third electrode arrays are disposed closer to the operation plane relative to second electrode arrays in a normal direction of the operation plane, the second electrode arrays have a portion protruding from the corresponding third electrode arrays when viewed in the normal direction, and assuming that a change amount of electrostatic capacitance between first and third electrode arrays occurred by an operation of the operating body is denoted by $\Delta C1$ and a change amount of electrostatic capacitance between the first and second electrode arrays occurred by an operation of the operating body is denoted by $\Delta C2$, a position of the operating body in the normal direction is calculated based on a ratio $\Delta C1/\Delta C2$.

15 Claims, 9 Drawing Sheets

(56) References Cited

U.S. PATENT DOCUMENTS

| | | | |
|---|---|---|---|
| 2012/0188200 A1 | 7/2012 | Roziere | |
| 2014/0009428 A1* | 1/2014 | Coulson | G06F 3/04166 |
| | | | 345/174 |
| 2015/0248180 A1 | 9/2015 | Wakuda | |

FOREIGN PATENT DOCUMENTS

| | | |
|---|---|---|
| JP | 2013-140635 | 7/2013 |
| JP | 2014-191654 | 10/2014 |
| JP | 2015-166921 | 9/2015 |
| JP | 2016-091149 | 5/2016 |
| JP | 2018-005932 | 1/2018 |

* cited by examiner

INPUT DEVICE

CLAIM OF PRIORITY

This application is a Continuation of International Application No. PCT/JP2019/046986 filed on Dec. 2, 2019, which claims benefit of Japanese Patent Application No. 2018-235638 filed on Dec. 17, 2018. The entire contents of each application noted above are hereby incorporated by reference.

BACKGROUND OF THE INVENTION

1. Field of the Invention

The present invention relates to an input device capable of reliably detecting, when an operator brings an operating body, such as a finger, close to or into contact with an operation plane, positional information of the operating body.

2. Description of the Related Art

In a capacitive input device disclosed in Japanese Unexamined Patent Application Publication No. 2015-166921, electrode portions positioned at opposite sides are determined as detection electrode portions, ground electrode portions are set between the detection electrode portions, and furthermore, a plurality of electrode portions positioned at a center are determined as driving detection portions. A coordinate position of a finger may be obtained by a difference of outputs of the detection electrode portions located at the opposite ends, and a vertical distance may be obtained by a sum of the outputs. When the vertical distance of the finger is smaller than a first threshold value, switching is performed such that a gap between the detection electrode portions is reduced, and when the finger further approaches, a touch detection mode is set.

A capacitive three-dimensional sensor disclosed in Japanese Unexamined Patent Application Publication No. 2016-091149 includes a first electrode body of a sheet shape having a patterned conductive film, a second electrode body of a sheet shape having a patterned conductive film, and a deformable body disposed between the first electrode body and the second electrode body. The deformable body includes an elastic layer substrate sheet and an elastic layer formed on one surface of the elastic layer substrate sheet. The deformable body is compressed and deformed when pressure is applied by the finger, and therefore, a distance between the first electrode body and the second electrode body is reduced. Accordingly, a pressing amount may be obtained by detecting a change in capacitance caused by the reduction of the distance.

The device disclosed in Japanese Unexamined Patent Application Publication No. 2018-005932 includes a detection surface, at least one capacitive sensor having a measurement electrode, a guard formed of an electrically conductive material disposed close to the measurement electrode, and electronic means for processing a signal emanating from the capacitive sensor. With this configuration, a distance from an object, a physical contact between the object and the detection surface, and downward pressing by the object may be detected when the object approaches.

A capacitance coupling type touch panel disclosed in Japanese Unexamined Patent Application Publication No. 2013-140635 includes a first transparent substrate, a second transparent substrate facing the first transparent substrate, and a plurality of coordinate electrodes that are disposed on the first transparent substrate and that detect a position coordinate. A floating electrode insulated from the plurality of coordinate electrodes is disposed on the second transparent substrate, and a gas layer and an interval-thickness control projecting pattern are disposed between the plurality of coordinate electrodes and the floating electrode. Accordingly, the floating electrode and the coordinate electrodes become close to each other since the floating electrode is pushed by a touch load obtained when a touch is performed by a resin pen or an insulating object, and therefore, capacitance between the floating electrode and the coordinate electrodes changes. Consequently, a position of the touch may be detected.

However, in the capacitive input devices disclosed in Japanese Unexamined Patent Application Publication Nos. 2015-166921, 2016-091149, 2018-005932, and 2013-140635, although a position of an operating body, such as a finger, on an operation plane may be detected, a shape or a size of the finger, for example, varies depending on an operator, and furthermore, a contact area to the operation plane varies depending on a contact pressure. Therefore, different capacitances are detected depending on sizes of contact areas when different fingers touch the same position, and accordingly, there arises a problem in that the same detection result may not be obtained in detections of positions in height in Japanese Unexamined Patent Application Publication Nos. 2015-166921, 2016-091149, and 2018-005932. Consequently, even though a detection of a relative position in a plane may be performed, it is difficult to detect an absolute position in height without influence of a contact area. Furthermore, the input device disclosed in Japanese Unexamined Patent Application Publication No. 2013-140635 may not perform a detection of a position in height in the first place.

SUMMARY OF THE INVENTION

Accordingly, the present invention provides an input device capable of reliably detecting, when an operator brings an operating body, such as a finger, close to or into contact with an operation plane, information on an absolute position in a normal direction relative to the operation plane irrespective of a size of a contact area.

The present invention provides an input device including an operation plane on which an operating body is operated. The operation plane has a first direction and a second direction intersecting with the first direction. The input device includes a plurality of first electrode arrays that individually extend in the first direction and that are arranged with intervals interposed between the first electrode arrays, a plurality of second electrode arrays that individually extend in the second direction and that are arranged with intervals interposed between the second electrode arrays, and a plurality of third electrode arrays that individually extend in the second direction and that are arranged with intervals interposed between the third electrode arrays. The plurality of third electrode arrays are arranged closer to the operation plane relative to the plurality of second electrode array in a normal direction of the operation plane. The second electrode arrays have respective portions that protrude from the corresponding third electrode arrays when viewed in the normal direction. When the plurality of first electrode arrays are set as driving electrodes, the plurality of second electrode arrays and the plurality of third electrode arrays are individually set as reception electrodes, and when the plurality of first electrode arrays are set as reception electrodes, the plurality of second electrode arrays and the plurality of third electrode arrays are individually set as driving electrodes. Assuming that a change amount of electrostatic capacitance between the plurality of first electrode arrays and the plurality of third electrode arrays occurred by an operation of the operating body is denoted by $\Delta C1$ and a change amount of electrostatic capacitance between the plurality of first electrode arrays and the plurality of second electrode arrays occurred by an operation of the operating body is denoted by $\Delta C2$, a position of the operating body in the normal direction relative to the operation plane is calculated based on a ratio $\Delta C1/\Delta C2$ of the change amount $\Delta C1$ and the change amount $\Delta C2$.

Accordingly, an input device that is capable of reliably detecting, when an operator brings an operating body, such as a finger, close to or into contact with an operation plane, information on an absolute position in a normal direction relative to the operation plane irrespective of a size of a contact area (or a projection area projected to the operation plane), that has high detection accuracy, and that may suppress malfunction or non-operation may be provided. Examples of the contact with the operation plane include a pressing operation for displacing or deforming the operation plane. Also when the pressing operation is to be performed, information on an absolute position in the normal direction of the operation plane may be detected with high accuracy irrespective of a size of an area of the pressing.

In the description below, examples of the contact area include an area of projection to the operation plane obtained when the operating body is brought close to the operation plane and an area of pressing obtained when the pressing operation is performed.

In the input device according to the present invention, the ratio $\Delta C1/\Delta C2$ preferably has a smaller value as a distance of the operating body to the operation plane is reduced.

Since the ratio $\Delta C1/\Delta C2$ is set substantially in proportion to the distance between the operation plane and the operating body, influence of a size of the area of contact with the operation plane is suppressed and information on a position in the normal direction of the operation plane may be detected with high accuracy.

In the input device according to the present invention, the plurality of second electrode arrays are preferably arranged closer to the plurality of first electrode arrays relative to the plurality of third electrode arrays in the normal direction.

By this, sensitivity of a detection of a position in height of the operating body relative to the normal direction of the operation plane may be enhanced.

In the input device according to the present invention, the plurality of second electrode arrays and the plurality of third electrode arrays preferably have the same arrangement pitch in the first direction.

By this, the substantially proportional relationship of the ratio $\Delta C1/\Delta C2$ relative to the distance between the operation plane and the operating body may be ensured and information on a position in the normal direction of the operation plane may be detected with high accuracy while influence of a size of the area of contact with the operation plane is suppressed.

In the input device according to the present invention, centers of gravity of the second electrode arrays and centers of gravity of the third electrode arrays preferably coincide with each other in the first direction.

By this, both the second electrode arrays and the third electrode arrays may be viewed in the normal direction and electrostatic capacitance coupling is reliably performed between the corresponding electrode arrays and the operating body. Accordingly, since the change amounts $\Delta C1$ and $\Delta C2$ of the electrostatic capacitances are generated for the second electrode arrays and the third electrode arrays, not only a detection of a position in the normal direction of the operation plane with high accuracy but also an input device of high reliability that suppresses occurrence of malfunction and non-detection may be realized based on the ratio $\Delta C1/\Delta C2$.

In the input device according to the present invention, an elastic deformation layer is preferably formed closer to the operation plane relative to the plurality of third electrode arrays in the normal direction.

By this, a distance between the operating body and the third electrode arrays changes by a small amount when a pressing operation is performed, and a configuration capable of detecting an amount of the change may be realized. Furthermore, when the elastic deformation layer is disposed on a front surface, the elastic deformation layer may be easily replaced when being worn.

In the input device according to the present invention, an elastic deformation layer is preferably formed between the plurality of third electrode arrays and the plurality of second electrode arrays in the normal direction.

By this, a configuration in which a distance between the second electrode arrays and the third electrode arrays changes may be realized, and an amount of the change in distance caused by a pressing operation may be detected.

In the input device according to the present invention, when a pressing operation is performed using the operating body on the operation plane, a position of the operating body in height from the operation plane in the normal direction and a position of the operating body in the plane direction of the operation plane are preferably calculated.

By this, an input device capable of detecting a pressing position may be provided.

In the input device according to the present invention, when the operating body separates from the operation plane, a position of the operating body in height from the operation plane in the normal direction and a corresponding position of the operating body in the operation plane are preferably calculated.

By this, not only an operation performed by touching the operation plane but also a detection of an operation of the operating body in a state in which the operating body is not in contact with the operation plane and a detection at a time of a pressing operation may be performed.

In the input device according to the present invention, an in-plane position in the operation plane is preferably detected based on electrostatic capacitances generated between the plurality of first electrode arrays and the plurality of second electrode arrays.

By this, a position detection in a direction in the operation plane and a detection of a distance to the operation plane may be simultaneously operated, and therefore, a three-dimensional position detection may be performed in any of a state in which the operation plane is not touched, a state in which a touch operation is performed on the operation plane, and a state in which a pressing operation is performed.

According to the present invention, when an operator brings an operating body, such as a finger, close to or into contact with an operation plane, information on an absolute position in a normal direction relative to the operation plane may be reliably detected irrespective of a size of a contact area.

DESCRIPTION OF THE PREFERRED EMBODIMENTS

Hereinafter, input devices according to embodiments of the present invention will be described in detail with reference to the accompanying drawings. Although a case where the present invention is applied to a touch panel having a capacitive sensor section formed on a planar substrate is described in the embodiments below, the input device of the present invention is not limited to this and is applicable to an input device having a curve-type capacitive sensor section or a device installed in the vicinity of a driver's seat, such as an installment panel of a vehicle, for example.

First Embodiment

Figure 1:
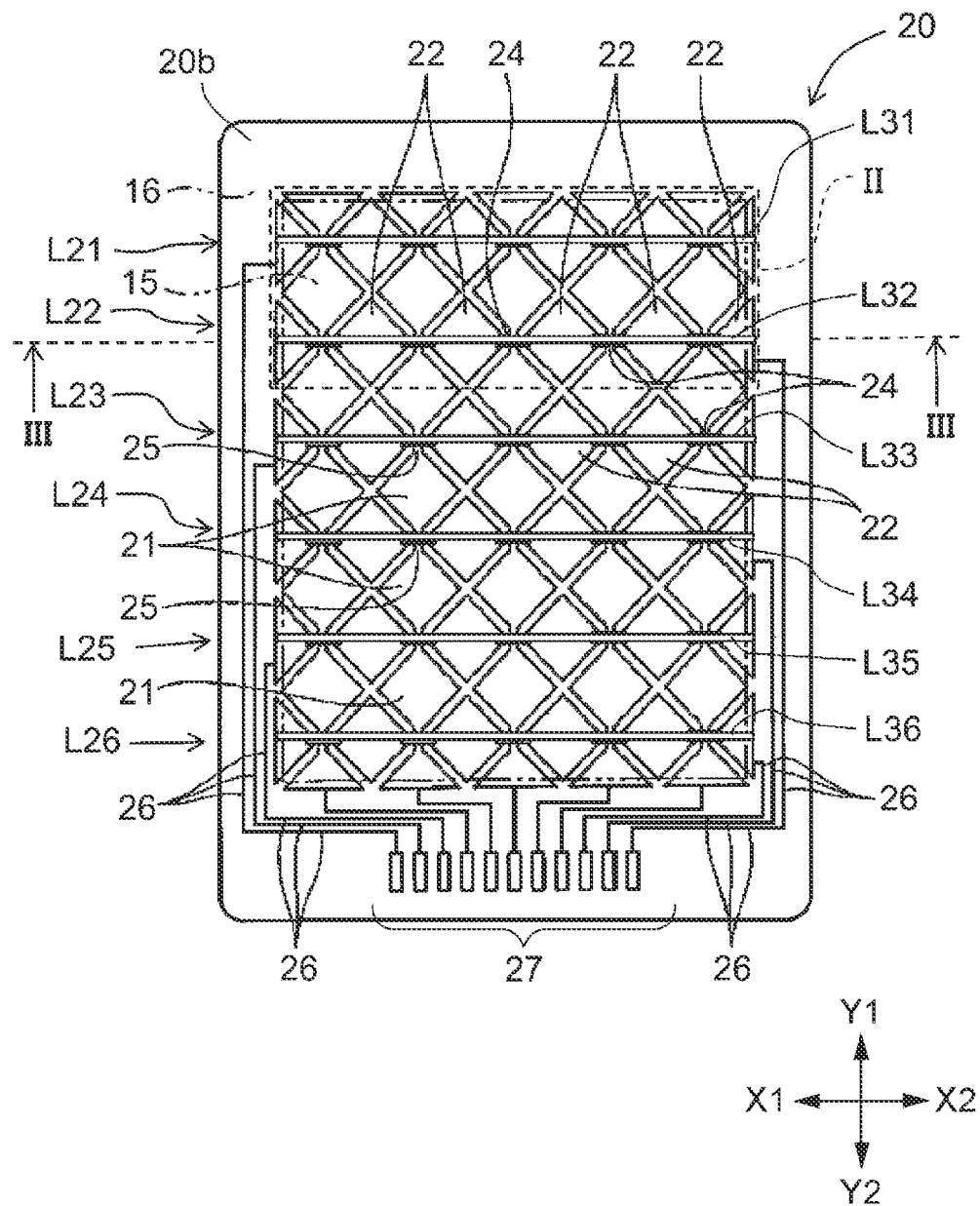
FIG. 1 is a plan view of a configuration of a capacitive sensor section and a plurality of third electrode arrays in a capacitive input device according to a first embodiment.
Figure 2:
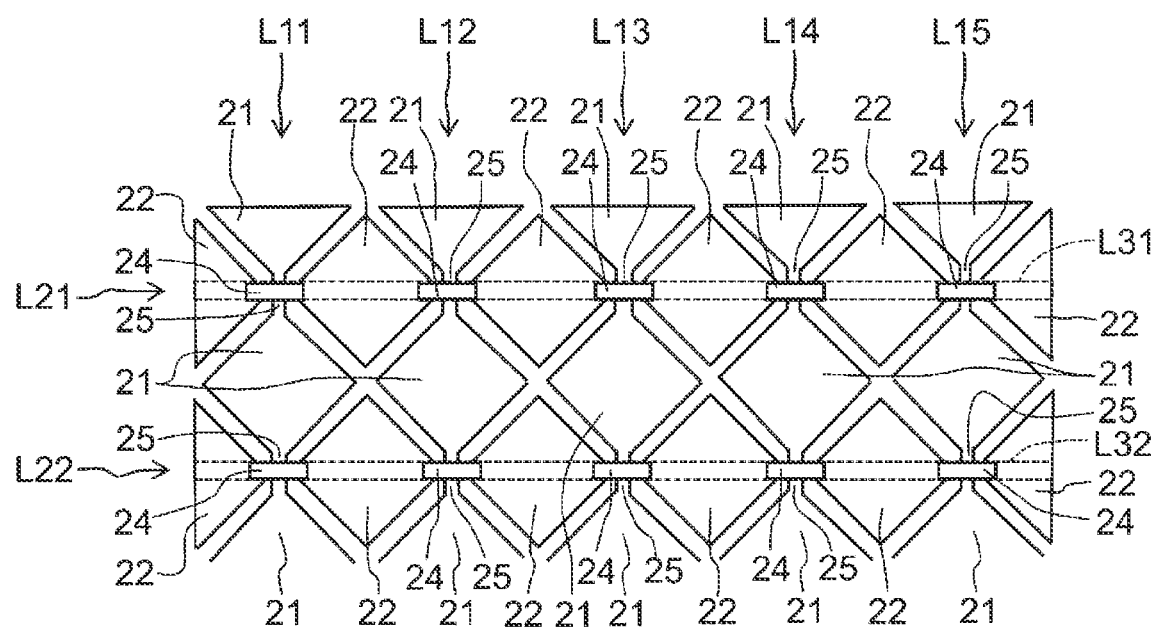
FIG. 2 is an enlarged view of a portion indicated by II in FIG. 1.
Figure 2:
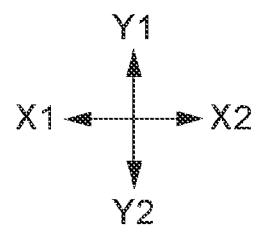
Figure 3:
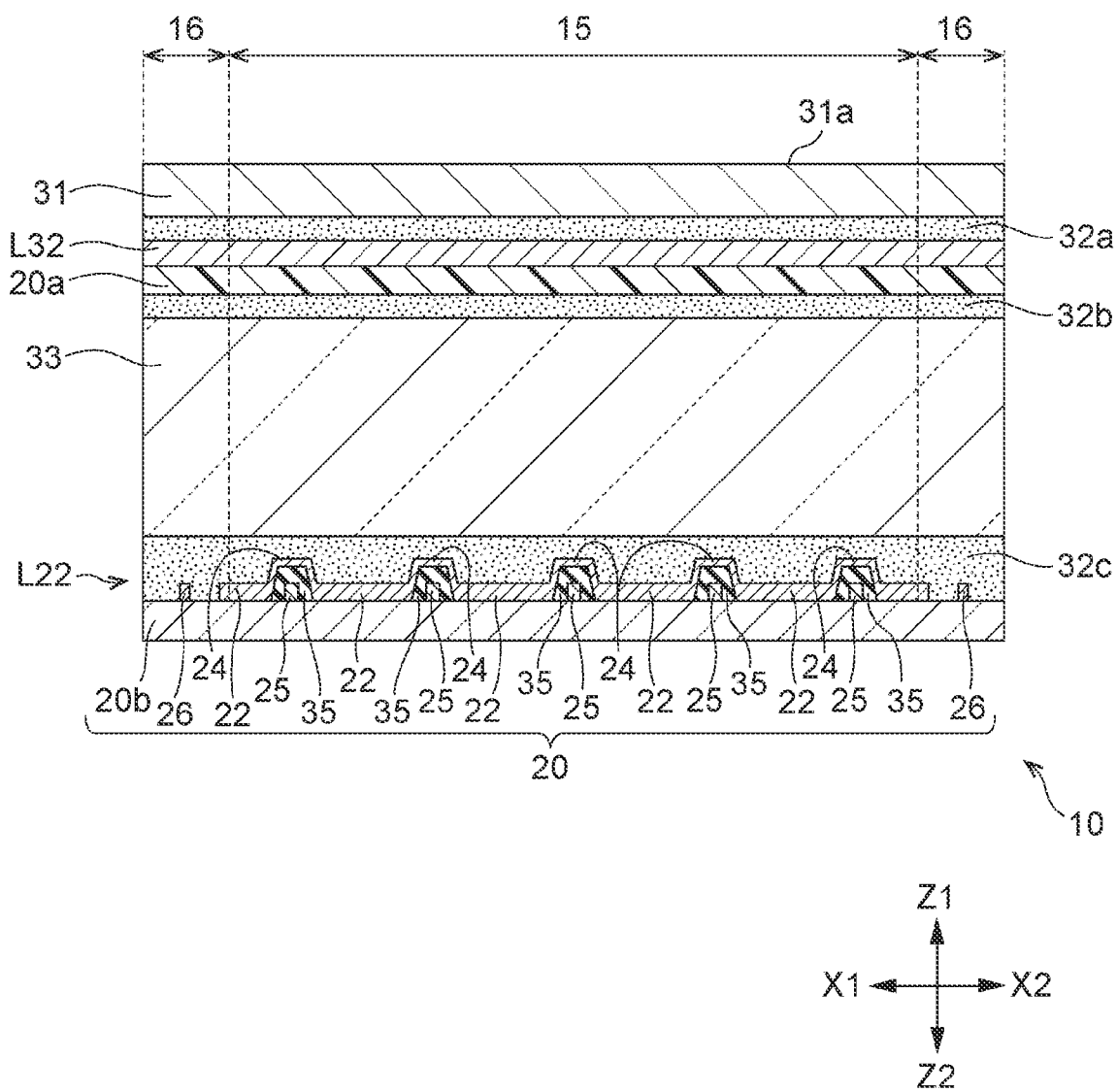
FIG. 3 is a sectional view of a configuration of the capacitive input device according to the first embodiment that is cut off in a position of a line of FIG. 1 and viewed in an arrow direction.
Figure 4:
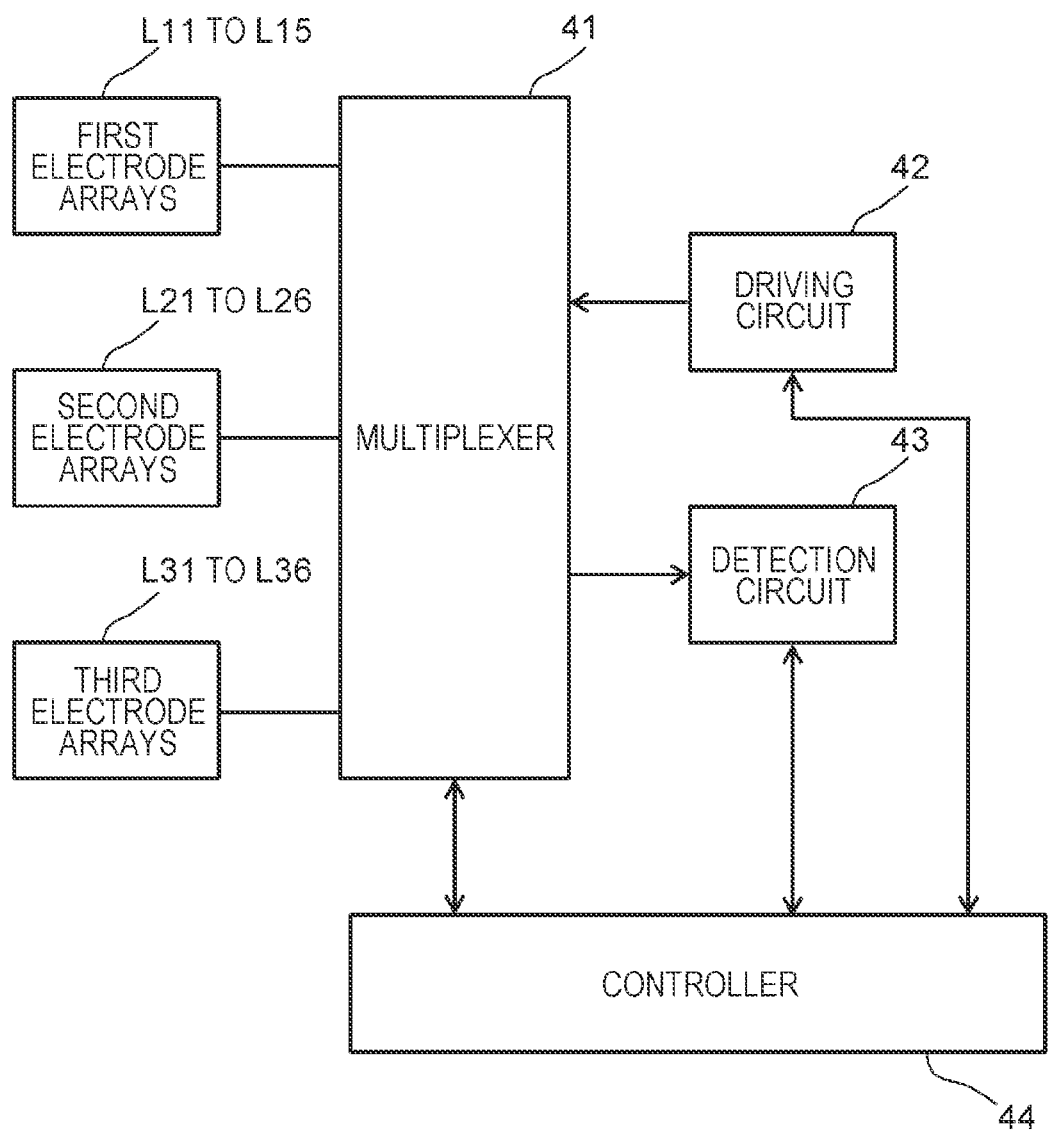
FIG. 4 is a functional block diagram of the capacitive input device according to the first embodiment.
Figure 5A:
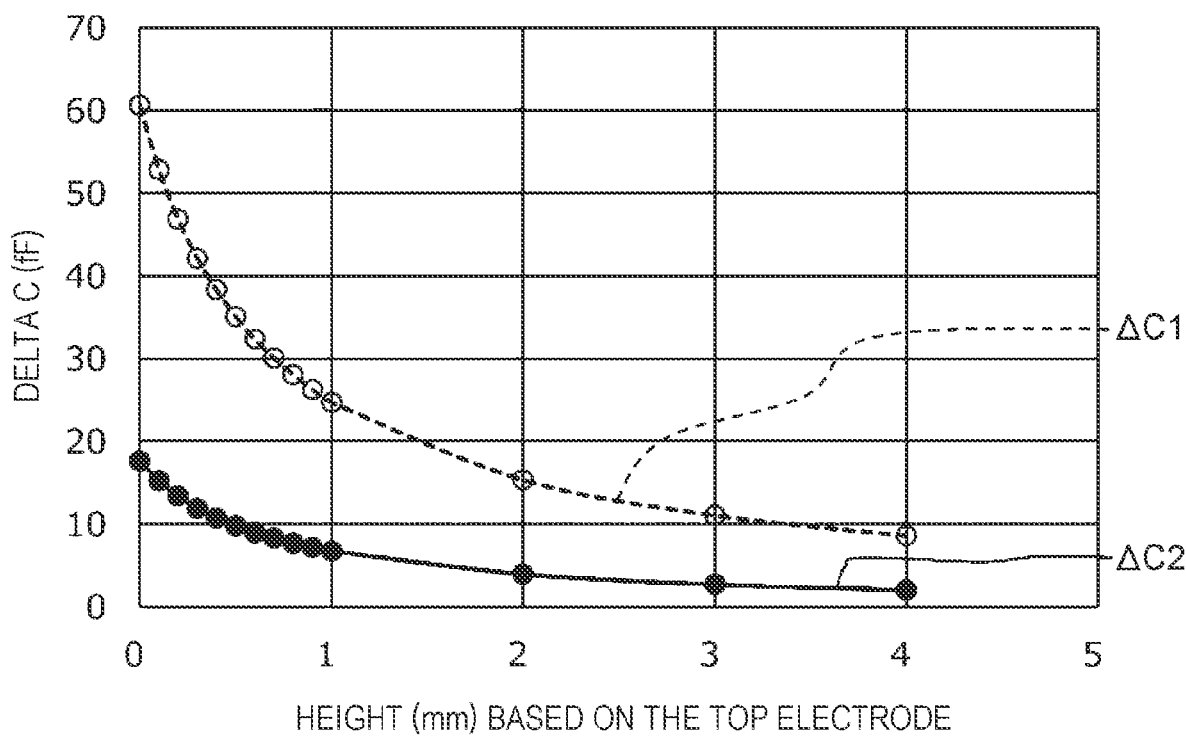
FIG. 5A is a graph of the relationship between a height of an operating body relative to an upper surface of the third electrode arrays and a change amount of capacitance.
Figure 5B:
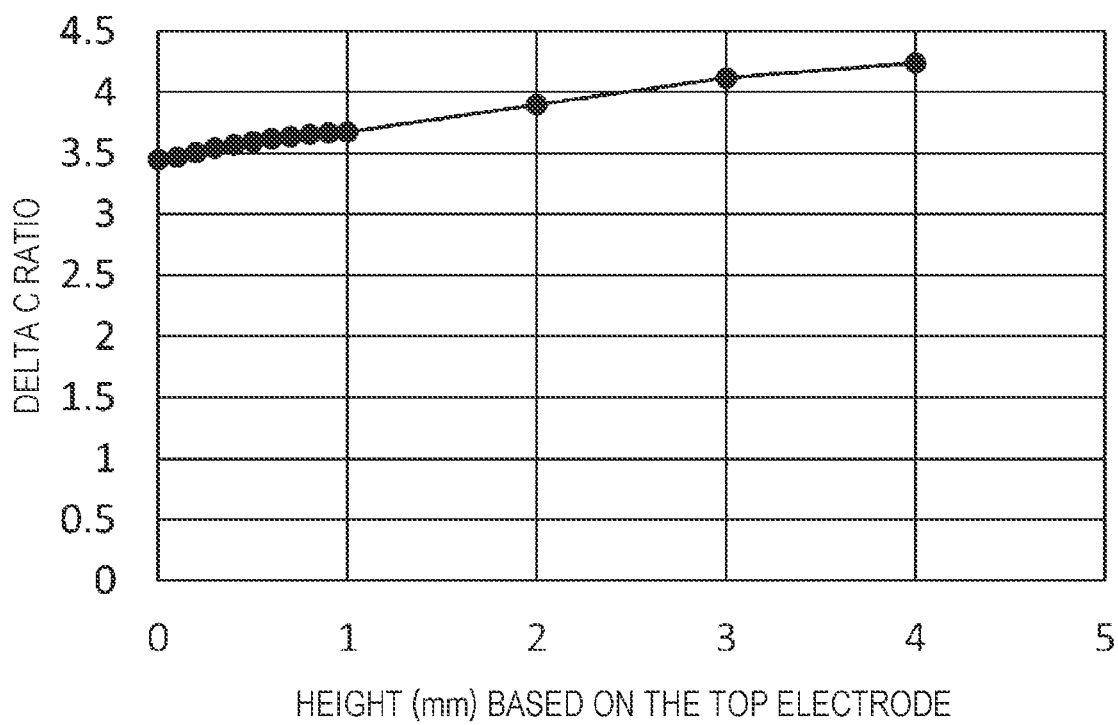
FIG. 5B is a graph of the relationship between a height of the operating body relative to the upper surface of the third electrode arrays and a ratio of a change amount of capacitance.

FIG. 1 is a plan view of a configuration of a capacitive sensor section 20 and third electrode arrays L31 to L36 in a capacitive input device 10 according to a first embodiment. Furthermore, the third electrode arrays L31 to L36 overlap the capacitive sensor section 20 as the arrangement relationship in FIG. 1. Note that, in FIG. 1, an elastic protection layer 31, three adhesive layers 32a to 32c, a substrate 20a, a panel body 33, and wiring lines to the third electrode arrays L31 to L36 are omitted. FIG. 2 is an enlarged view of a portion indicated by II in FIG. 1. FIG. 3 is a sectional view of a configuration of the capacitive input device 10 that is cut off in a position of a line of FIG. 1 and viewed in an arrow direction. FIG. 4 is a functional block diagram of the capacitive input device 10 according to the first embodiment. FIG. 5A is a graph of the relationship between a height of an operating body relative to an upper surface of the third electrode arrays L31 to L36 (an axis of abscissae) and a change amount of capacitance (an axis of ordinates), and FIG. 5B is a graph of the relationship between a height of the operating body relative to the upper surface of the third electrode arrays L31 to L36 (an axis of abscissae) and a ratio of a change amount of capacitance (an axis of ordinates).

In FIGS. 1 to 3, an X-Y-Z coordinate is illustrated as a reference coordinate. A Z1-Z2 direction corresponds to a thickness direction (a vertical direction) of the capacitive input device 10, and an XY plane is perpendicular to the Z1-Z2 direction. An X1-X2 direction and a Y1-Y2 direction perpendicularly intersect with each other in the XY plane. In a description below, a state in which a Z2 side is viewed from a Z1 side in the Z1-Z2 direction is referred to as a plan view and a shape in plan view is referred to as a planar shape. The plan view corresponds to a view in a normal direction of an upper surface 31a (an operation plane) of the elastic protection layer 31. The upper surface 31a of the elastic protection layer 31 serving as the operation plane has a Y1-Y2 direction as a first direction and an X1-X2 direction as a second direction in the plane. Although a case where the device is installed while the Z1-Z2 direction is set as a vertical direction is described hereinafter, the input device may be used in other attitudes.

As illustrated in FIG. 3, the capacitive input device 10 includes the capacitive sensor section 20 that detects input position information, the panel body 33, the third electrode arrays L31 to L36 formed on the substrate 20a, and the elastic protection layer 31. The panel body 33, the substrate 20a, the third electrode arrays L31 to L36, and the elastic protection layer 31 are arranged in this order from a side of the capacitive sensor section 20 to an input operation side (the Z1 direction in FIG. 3). The elastic protection layer 31 and the third electrode arrays L31 to L36 adhere to each other through the first adhesive layer 32a, the substrate 20a and the panel body 33 adhere to each other through the second adhesive layer 32b, and furthermore, the panel body 33 and the capacitive sensor section 20 adhere to each other through the third adhesive layer 32c.

An optical clear adhesive (OCA) is used for the three adhesive layers 32a, 32b, and 32c, for example, or the three adhesive layers 32a, 32b, and 32c are formed by in-mold lamination (IML) or in-mold decoration (IMD).

The capacitive sensor section 20 includes (1) a substrate 20b and (2) first electrode arrays L11 to L15, second electrode arrays L21 to L26, bridge portions 24, coupling portions 25, wiring lines 26, and terminal sections 27 that are formed on the substrate 20b.

<Elastic Protection Layer 31>

The elastic protection layer 31 (elastic deformation layer) is formed in a rectangular shape so as to cover the capacitive sensor section 20 in plan view, and the upper surface 31a serves as an operation plane of the capacitive input device 10. Operations are performed on the operation plane using an operating body, such as a finger or a hand of the operator. The elastic protection layer 31 (the elastic deformation layer) is disposed near the operation plane relative to the first electrode array L11 to L15 and the second electrode array L21 to L26 and near the operation plane relative to the third electrode array L31 to L36.

Examples of the operating body include a finger or a hand of an operator and a stylus or a touch pen that is compatible with capacitive input devices. When the input device is to be applied to a vehicle, the input device may be disposed on a steering wheel for operating the vehicle, for example. In this case, a hand of a driver holding the steering wheel corresponds to the operating body. The input device may detect a position of the hand on the steering wheel and a degree of strength of grabbing by the hand. Furthermore, when the input device is disposed on seating face or a seat back portion of the vehicle, a back, hips, or legs of a person on the seat corresponds to the operating body so that a body state, such as stability of seating of the person on the seat, may be detected.

The elastic protection layer 31 is configured by non-conductive material that may be elastically deformed when force is vertically applied by an operation using the operating body. Examples of the material include silicone rubber, urethane rubber, acrylic rubber, and fluorine-contained rubber. Properties of the elastic protection layer 31, such as a thickness, light transparency, and a color, may be appropriately selected in accordance with the specification of the capacitive input device 10.

A colored opaque decorative layer may be formed on a back surface (a surface in the Z2 direction of FIG. 1) of the elastic protection layer 31 in accordance with the specification of the capacitive input device 10. The decorative layer is disposed by printing or the like such that the decorative layer overlaps a non-input region 16 disposed outside an input region 15 of the capacitive sensor section 20 in plan view.

<Panel Body 33>

The panel body 33 has a rectangular shape so as to cover the capacitive sensor section 20 in plan view. The panel body 33 is configured by non-conductive material having rigidity. Examples of the material include polycarbonate resin, polymethyl methacrylate resin, other acrylic resins, and glass. As described hereinafter, a thickness of the panel body 33 is set such that the second electrode arrays L21 to L26 and the third electrode arrays L31 to L36 are disposed with a predetermined interval in the vertical direction. Properties of the panel body 33, such as light transparency and a color, may be appropriately selected in accordance with specification of the capacitive input device 10.

<First Electrode Array and Second Electrode Array>

As illustrated in FIG. 1, a plurality of first electrodes 21 and a plurality of second electrodes 22 are arranged in the input region 15 of the capacitive sensor section 20.

The capacitive sensor section 20 includes the substrate 20b and a plurality of first electrodes 21, a plurality of second electrodes 22, and the plurality of wiring lines 26 that are formed on a substrate surface (an upper surface on a Z1 side) of the substrate 20b. The first electrodes 21 and the second electrodes 22 are formed in the input region 15 and have a pad shape having a plane extending in the XY plane.

The first electrodes 21 are disposed in the Y1-Y2 direction (the first direction) with intervals. The first electrodes 21 that are adjacent to each other in the Y1-Y2 direction are coupled with each other by the narrow coupling portions 25 to form a first electrode array. As illustrated in FIG. 2, five first electrode arrays L11 to L15 are arranged in the X1-X2 direction (the second direction) with intervals.

The second electrodes 22 are disposed in the X1-X2 direction (the second direction) with intervals. The second electrodes 22 that are adjacent to each other in the X1-X2 direction are coupled with each other by the narrow bridge portions 24 to form a second electrode array. In the configuration illustrated in FIGS. 1 and 2, six second electrode arrays L21 to L26 are arranged in the Y1-Y2 direction (the first direction) with intervals.

As illustrated in FIGS. 1 and 2, the plurality of first electrode arrays L11 to L15 and the plurality of second electrode arrays L21 to L26 intersect with each other. As illustrated in FIG. 3, in each portion where the coupling portion 25 and the bridge portion 24 intersect with each other, an intersecting portion insulating layer 35 is disposed to cover the coupling portion 25, and the bridge portion 24 is formed so as to stride the coupling portion 25 and the intersecting portion insulating layer 35. The first electrodes 21 are coupled to each other through the coupling portions 25, and the second electrodes 22 disposed so as to sandwich the coupling portions 25 in the X1-X2 direction are coupled to each other through the bridge portions 24. In this way, the first electrodes 21 and the second electrodes 22 are insulated from each other.

As illustrated in FIG. 1, the plurality of wiring lines 26 coupled to the first electrodes 21 and the second electrodes 22 are formed in the non-input region 16 of the substrate 20b. The plurality of wiring lines 26 are drawn in the non-input region 16 of the substrate 20b and coupled to the terminal portions 27 to be coupled to an external circuit.

The substrate 20b is formed of non-conductive resin material of a film shape, and for example, translucent resin material, such as polycarbonate resin, polyethylene terephthalate resin, polyethylene naphthalate resin, cyclic polyolefin, or polymethyl methacrylate resin, is used. The first electrodes 21, the second electrodes 22, and the coupling portions 25 are translucent conductive material, such as indium tin oxide (ITO), $SnO_2$, or ZnO, by thin film method, such as spattering or evaporation. Furthermore, the bridge portions 24 are formed by metal material, such as Cu, Ag, or Au, alloy, such as CuNi or AgPd, or conductive oxide material, such as ITO. As the wiring lines 26 and the terminal portions 27, metal material, such as Cu, Ag, or Au, or conductive oxide material, such as ITO, may be used.

<Third Electrode Arrays>

As illustrated in FIG. 1, the six third electrode arrays L31 to L36 are arranged in the input region 15 of the capacitive input device 10. The third electrode arrays L31 to L36 are formed on the substrate 20a (FIG. 3).

The third electrode arrays L31 to L36 are formed in respective lines having the same width extending in the X1-X2 direction (the second direction). In the configuration illustrated in FIG. 1, the six third electrode arrays L31 to L36 are arranged in the Y1-Y2 direction (the first direction) with intervals.

The third electrode arrays L31 to L36 overlap the second electrode arrays L21 to L26 in plan view, respectively, and furthermore, overlap the bridge portions 24 that couple the plurality of second electrodes 22 forming the individual second electrode arrays to one another in plan view.

Furthermore, the third electrode arrays L31 to L36 are disposed in the Y1-Y2 direction with the same arrangement pitch as the second electrode arrays L21 to L26, and centers of gravity of the third electrode arrays L31 to L36 coincide with the corresponding second electrode arrays in the Y1-Y2 direction.

As illustrated in FIGS. 1 and 2, the individual third electrode arrays L31 to L36 have substantially the same width as the bridge portions 24 in the Y1-Y2 direction. Therefore, in plan view, the individual second electrodes 22 of the second electrode arrays have respective portions that protrude from the corresponding third electrode arrays. Since at least certain amount of protrusion is ensured, the third electrode arrays interposed between the second electrode arrays and the operating body in the vertical direction do not disturb a change in capacitance, and therefore, a detection may be reliably performed by the second electrode arrays.

As illustrated in FIG. 3, in the vertical direction, the third electrode arrays L31 to L36 are arranged on the capacitive sensor section 20 through the panel body 33, the second adhesive layer 32b, and the substrate 20a, and are disposed closer to the upper surface 31a of the elastic protection layer 31 relative to the capacitive sensor section 20 including the second electrode arrays.

The substrate 20a on which the third electrode arrays L31 to L36 are disposed is formed of, similarly to the substrate 20b in the capacitive sensor section 20, a non-conductive resin material of a film shape. The third electrode arrays L31 to L36 are formed of, similarly to the first electrodes 21, the second electrodes 22, and the coupling portions 25, translucent conductive material, such as ITO, $SnO_2$, or ZnO.

Although not illustrated, a plurality of wiring lines individually coupled to the third electrode arrays L31 to L36 are formed in the non-input region 16 of the substrate 20a. The plurality of wiring lines are drawn in the non-input region 16 to be coupled to terminal portions (not illustrated) to be connected to an external circuit.

<Change in Electrostatic Capacitance>

When the five first electrode arrays L11 to L15 are set as driving electrodes, the six second electrode arrays L21 to L26 and the six third electrode arrays L31 to L36 are individually set as reception electrodes. When the five first electrode arrays L11 to L15 are set as reception electrodes, the six second electrode arrays L21 to L26 and the six third electrode arrays L31 to L36 are individually set as driving electrodes. In any of these configurations, electrostatic capacitances are formed between the individual first electrode arrays L11 to L15 and the individual second electrode arrays L21 to L26. The electrostatic capacitances are changed when electrostatic capacitances formed between the operating body and the reception electrodes are coupled by causing the operating body to move close to the operation plane or to move away from the operation plane. A position of the operating body in the operation plane is detected based on a position where the change in electrostatic capacitance occurs in the XY plane.

As illustrated in FIG. 4, the first electrode arrays L11 to L15, the second electrode arrays L21 to L26, and the third electrode arrays L31 to L36 are coupled to a multiplexer 41, and a driving circuit 42 and a detection circuit 42 are coupled to the multiplexer 41. The multiplexer 41, the driving circuit 42, and the detection circuit 43 are coupled to a controller 44 (a control circuit) that controls processes of the multiplexer 41, the driving circuit 42, and the detection circuit 43.

The multiplexer 41 causes the driving circuit 42 to be coupled to electrode arrays set as driving electrodes selected from among the first electrode arrays L11 to L15, the second electrode arrays L21 to L26, and the third electrode arrays L31 to L36 and causes the detection circuit 43 to be coupled to electrode arrays set as reception electrodes. A result of detection performed by the detection circuit 43 is stored in a storage section included in the controller 44, and the controller 44 executes calculations of a ratio of the electrostatic capacitance and the like based on the detection result.

For example, when a voltage is applied from the driving circuit 42 to the first electrode arrays L11 to L15 serving as driving electrodes in turn, current is supplied to the individual second electrode arrays L21 to L26 and the individual third electrode arrays L31 to L36 serving as reception electrodes at a timing of rising and falling of rectangle waves, and the detection currents are supplied to the detection circuit 43. The detection circuit 43 converts the detection currents into voltages, integrates and amplifies the voltages, and performs A/D conversion so as to output a detection result to the controller 44.

When the operator brings the operating body, such as a finger or a hand, into contact with or close to the input region 15 of the upper surface 31a (the operation plane) of the elastic protection layer 31 to perform an input operation, in an electrode array positioned proximal to the operating body among the second electrode arrays L21 to L26, electrostatic capacitance formed between the second electrode 22 and the operating body is coupled to electrostatic capacitance generated between the second electrode 22 and the first electrode 21 that are adjacent to each other. Therefore, a value of electrostatic capacitance detected in the second electrode 22 with which the operating body is in contact or to which the operating body moves close is changed. As described below, a position (a height position) in the normal direction of the operation plane is detected based on an amount $\Delta C2$ of this change.

When the operator brings the operating body, such as a finger or a hand, into contact with or close to the input region 15 of the upper surface 31a (the operation plane) of the elastic protection layer 31, electrostatic capacitance formed between an electrode array that is proximal to the operating body selected from among the third electrode arrays L31 to L36 (a proximal third electrode array) and the operating body is coupled to electrostatic capacitance generated between one of the first electrode arrays L11 to L15 intersecting with the proximal third electrode array in plan view and the proximal third electrode array. Therefore, a value of electrostatic capacitance detected in the proximal third electrode array (one of the third electrode arrays L31 to L36 that is into contact with the operating body or that is close to the operating body) is changed. As described below, a position (a height position) in the normal direction of the operation plane is detected based on a change amount $\Delta C1$.

Here, as illustrated in FIG. 3, the second electrode arrays L21 to L26 and the third electrode arrays L31 to L36 are disposed in a lower portion and an upper portion, respectively, with the substrate 20a, the second adhesive layer 32b, the panel body 33, and the third adhesive layer 32c that are formed of non-conductive material interposed therebetween. In other words, in the vertical direction, the second electrode arrays L21 to L26 and the third electrode arrays L31 to L36 are disposed with a certain gap through the non-conductive material. The certain gap (the gap between the second electrode arrays and the third electrode arrays) is larger than a gap between the first electrode arrays L11 to L15 and the second electrode arrays L21 to L26 in the vertical direction, and is predetermined times as large as the gap between the first electrode arrays L11 to L15 and the second electrode arrays L21 to L26.

With this configuration, assuming that a change amount of electrostatic capacitance between the first electrode arrays L11 to L15 and the third electrode arrays L31 to L36 occurred by an operation of the operating body is represented by $\Delta C1$, a change amount of electrostatic capacitance between the first electrode arrays L11 to L15 and the second electrode arrays L21 to L26 occurred by an operation of the operating body is represented by $\Delta C2$, as illustrated in FIG. 5A, the two change amounts $\Delta C1$ and $\Delta C2$ are differently changed relative to a distance (an axis of abscissae (a unit of mm) of FIG. 5A) of the operating body to an upper surface of the third electrode arrays L31 to L36 (Height Based on the top electrode) depending on a gap in the vertical direction between the second electrode arrays L21 to L26 and the third electrode arrays L31 to L36. Here, in FIG. 5A, the change amount ΔC1 is represented by a dotted line including white circles and the change amount ΔC2 is represented by a solid line including black circles.

Furthermore, when a ratio ΔC1/ΔC2 of the two change amounts ΔC1 and ΔC2 is plotted relative to the distance of the operating body to the upper surface of the third electrode arrays, as illustrated in FIG. 5B, the linear relationship is obtained and the ratio is reduced as the distance of the operating body to the operation plane is reduced. Therefore, based on this straight line, a position in height from the operation plane in the Z1-Z2 direction (the normal direction relative to the operation plane) and a position in the operation plane may be accurately detected (calculated). In particular, use of the ratio ΔC1/ΔC2 enables elimination of influence of a size of an area of the operating body in a plane direction of the operation plane, and accordingly, an absolute value of a position in height from the operation plane and an absolute value of a corresponding position in the operation plane (an in-plane position) may be accurately detected.

Here, results of simulation in a configuration in which sizes of individual layers are set as below are illustrated in FIGS. 5A and 5B. Thicknesses correspond to sizes in the Z1-Z2 direction.

Elastic protection layer 31: a thickness of 1.0 mm;
First adhesive layer 32a: a thickness of 0.1 mm;
Third electrode arrays L31 to L36: a width in the Y1-Y2 direction of 0.20 mm and a thickness of 20 nm;
Substrate 20a: a thickness of 0.05 mm;
Second adhesive layer 32b: a thickness of 0.1 mm;
Panel body 33: a thickness of 3.00 mm;
Third adhesive layer 32c: a thickness of 0.175 mm (max);
First electrode arrays L11 to L15: a diagonal length of 6.20 mm (lengths in the X1-X2 direction and the Y1-Y2 direction) and a thickness of 20 nm;
Second electrode arrays L21 to L26: a diagonal length of 6.20 mm (lengths in the X1-X2 direction and the Y1-Y2 direction) and a thickness of 20 nm;
Substrate 20b: a thickness of 0.05 mm.

Hereinafter, a modification will be described. In the foregoing embodiment, the second electrode arrays L21 to L26 are arranged in the same layer as the first electrode arrays L11 to L15, stride over the first electrode arrays L11 to L15 in the bridge portions 24, and are positioned closer to the first electrode arrays L11 to L15 relative to the third electrode arrays L31 to L36 in the vertical direction (the normal direction of the operation plane). Meanwhile, the second electrode arrays L21 to L26 may be disposed on an upper side or a lower side of the first electrode arrays L11 to L15 in the vertical direction as long as the second electrode arrays L21 to L26 are positioned closer to the first electrode arrays L11 to L15 relative to the third electrode arrays L31 to L36 in the vertical direction.

Figure 6:
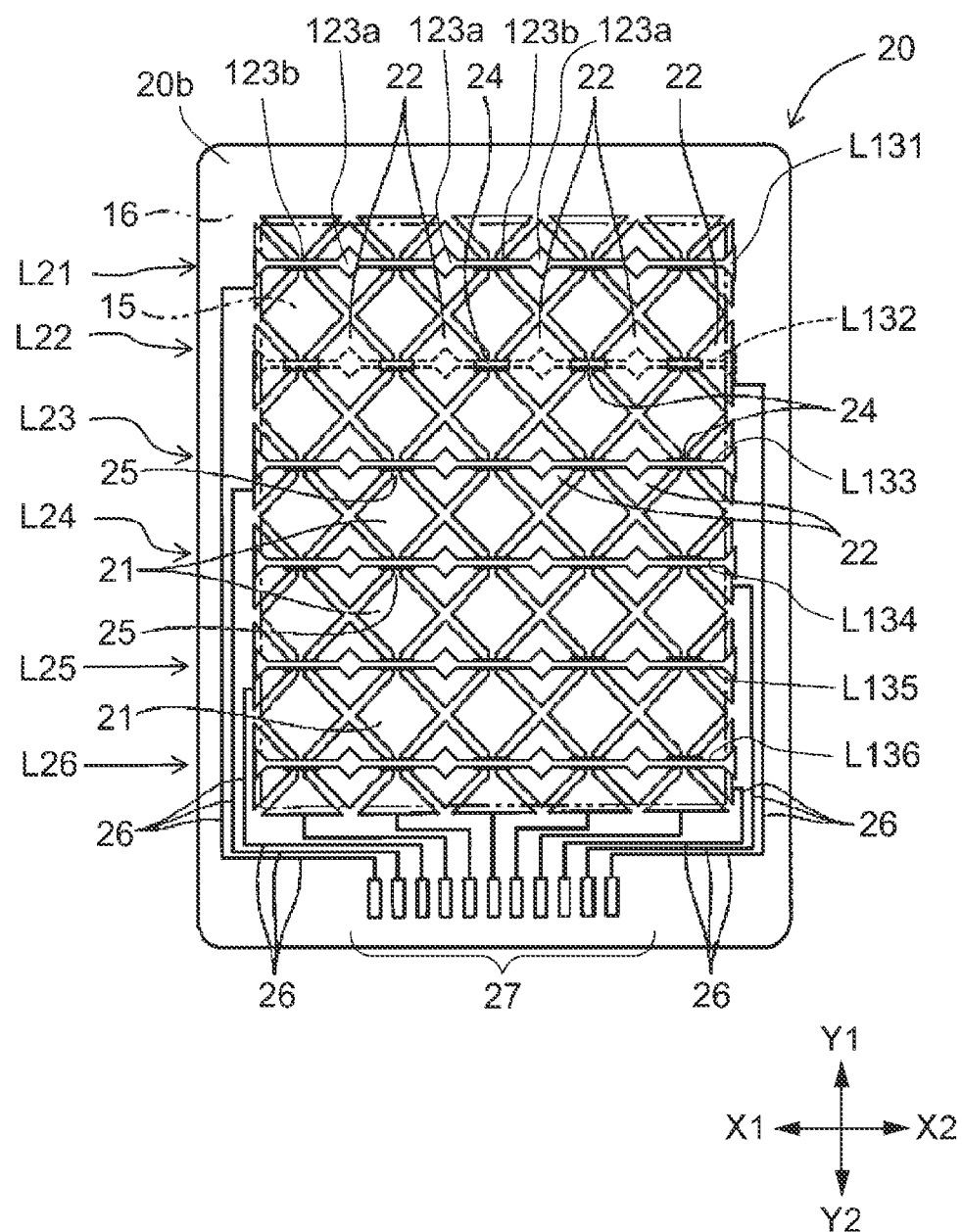
FIG. 6 is a plan view of the capacitive sensor section according to the first embodiment to which third electrode arrays according to a first modification are applied.

Furthermore, shapes of the second electrode arrays and the third electrode arrays in plan view are not limited to the shapes described in the foregoing embodiment as long as centers of gravity of the second electrode arrays and the corresponding third electrode arrays that correspond to each other coincide with each other in a direction in which the first electrode arrays L11 to L15 individually extend (the Y1-Y2 direction (the first direction)) and the second electrode arrays protrude from the third electrode arrays by a predetermined amount or more in plan view. For example, third electrode arrays L131 to L136 having a planar shape as illustrated in FIG. 6 may be used instead of the third electrode arrays L31 to L36 in the foregoing embodiment. Here, FIG. 6 is a plan view of the capacitive sensor section 20 according to the first embodiment to which the third electrode arrays L131 to L136 according to a first modification are applied. In FIG. 6, only the third electrode array L132 is represented by a dotted line among the third electrode arrays L131 to L136 so that the positional relationships with bridge portions 24 are clearly illustrated.

In each of the third electrode arrays L131 to L136 illustrated in FIG. 6, a plurality of third electrodes 123a are disposed with intervals in the X1-X2 direction and are coupled to one another by narrow coupling portions 123b extending in the X1-X2 direction. The third electrodes 123a have a shape similar to that of the second electrodes 22 in plan view and are disposed such that centers of gravity thereof coincide with those of the corresponding second electrodes 22. Furthermore, the third electrodes 123a are shaped small such that the corresponding second electrodes 22 protrude by a predetermined amount or more in plan view. Furthermore, the coupling portions 123b have substantially the same width as the bridge portions 24 so as to overlap with the bridge portions 24 in plan view.

Figure 7:
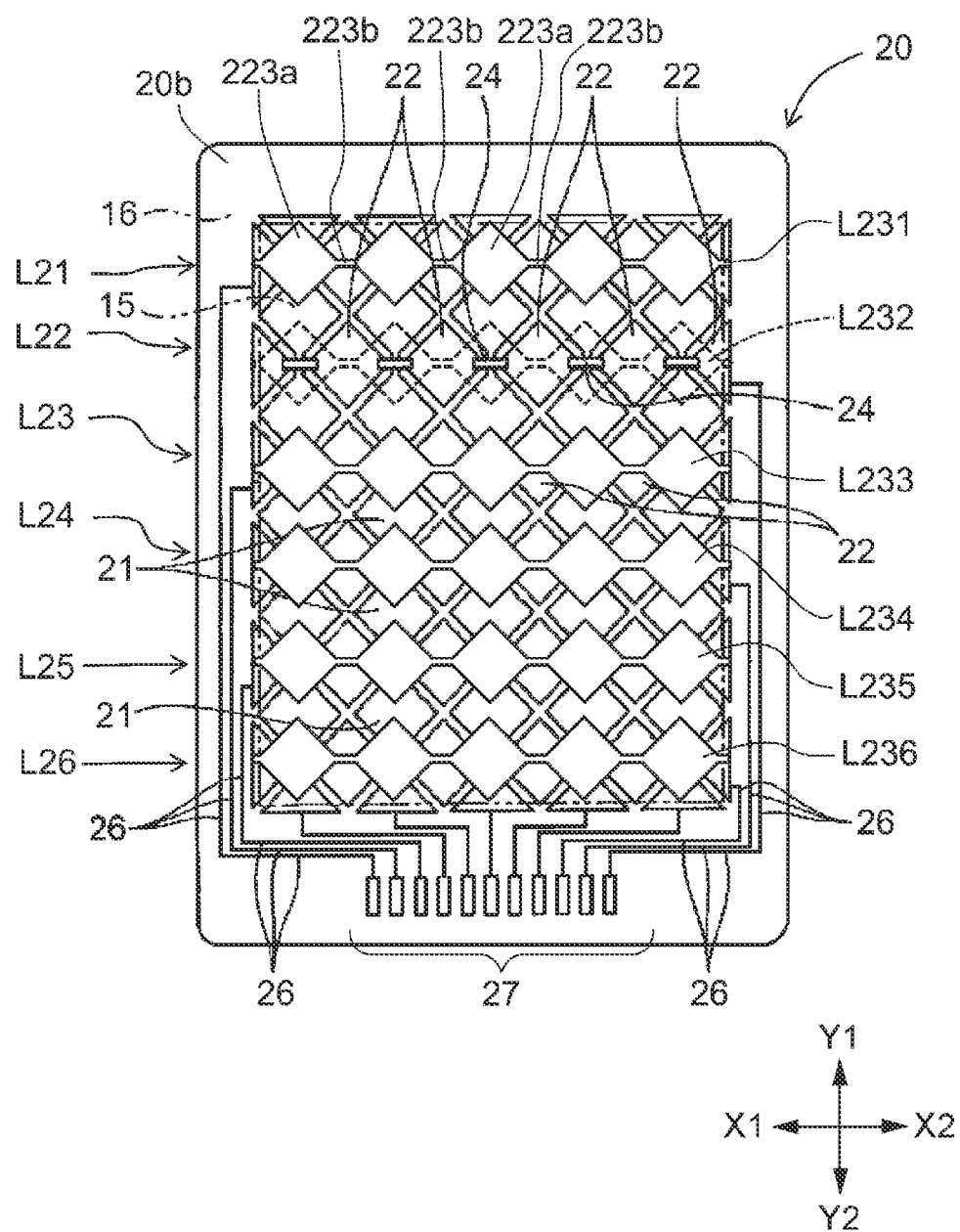
FIG. 7 is a plan view of the capacitive sensor section according to the first embodiment to which third electrode arrays according to a second modification are applied.

As for the configuration in which the centers of gravity of the second electrode arrays and the centers of gravity of the corresponding third electrode arrays coincide with each other in a direction in which the first electrode arrays L11 to L15 individually extend (the Y1-Y2 direction (the first direction)), as illustrated in FIG. 7, the third electrode arrays may be shifted from the corresponding second electrode arrays in the X1-X2 direction. Here, FIG. 7 is a plan view of the capacitive sensor section 20 according to the first embodiment to which third electrode arrays L231 to L236 according to a second modification are applied. In FIG. 7, only the third electrode array L232 is represented by a dotted line among the third electrode arrays L231 to L236 so that the positional relationships with bridge portions 24 are clearly illustrated.

In the third electrode arrays L231 to L236 illustrated in FIG. 7, a plurality of third electrodes 223a are disposed with intervals in the X1-X2 direction and are coupled to one another by narrow coupling portions 223b extending in the X1-X2 direction. The third electrodes 223a have the same shape as the second electrodes 22 in plan view and are disposed in intermediate positions between the adjacent second electrodes 2 in the X1-X2 direction. The coupling portions 223b have substantially the same width as the bridge portions 24 so as to overlap with the bridge portions 24 in plan view. According to this configuration, although the third electrodes 223a and the second electrodes 22 have the same area, an amount of protrusion of the second electrodes 22 is ensured to be equal to or larger than the predetermined amount in plan view. Accordingly, large reception electrodes may be ensured in both the second electrode arrays and the third electrode arrays and a change in electrostatic capacitance may be more reliably detected, and therefore, as with the first embodiment, an absolute value of a position in height in a normal direction of the operation plane may be accurately detected based on the change amount of the electrostatic capacitance and a position in the operation plane may be accurately detected based on the position where the electrostatic capacitance is changed.

Second Embodiment

Figure 8:
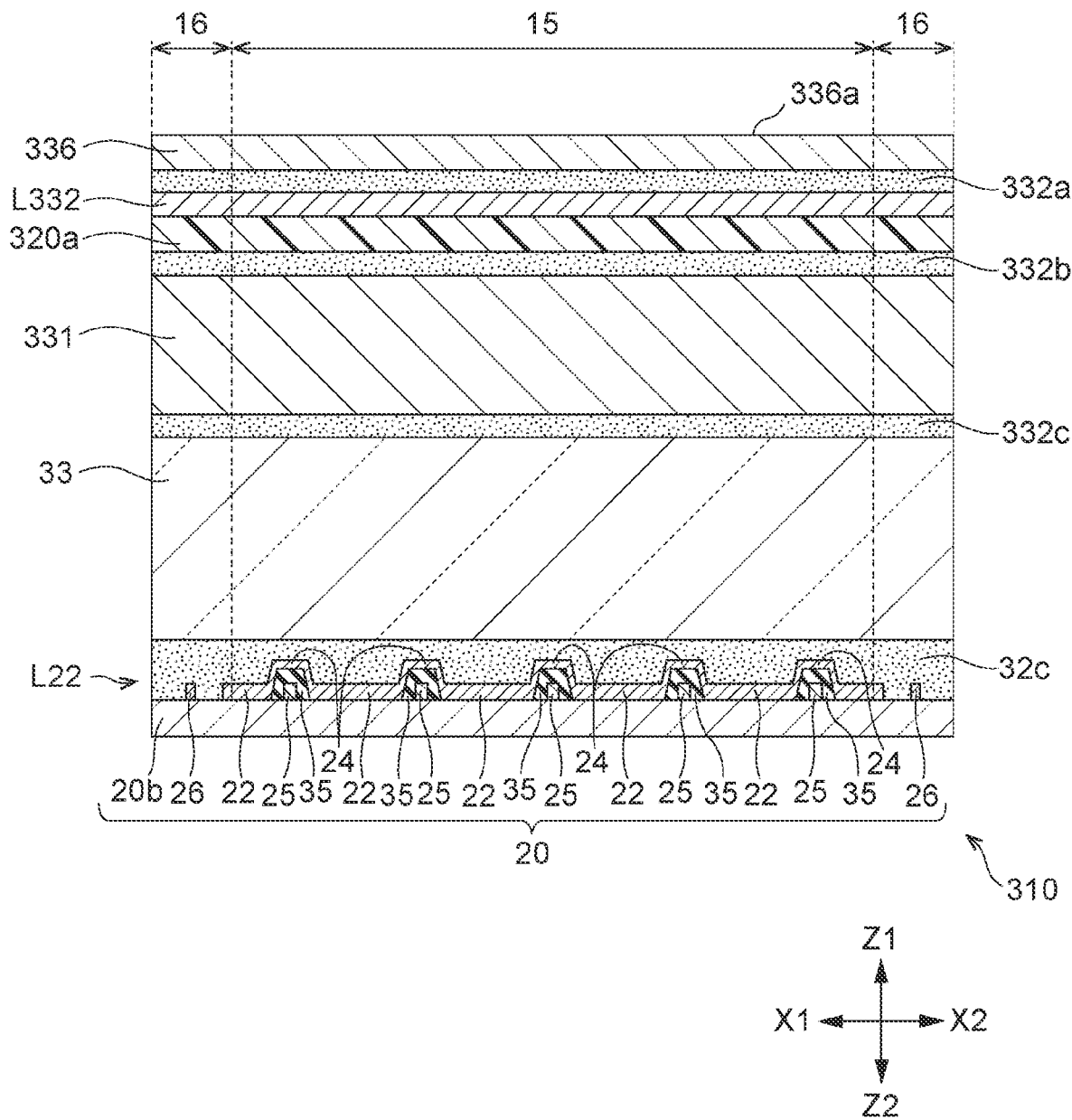
FIG. 8 is a sectional view of a configuration of a capacitive input device according to a second embodiment.
Figure 9A:
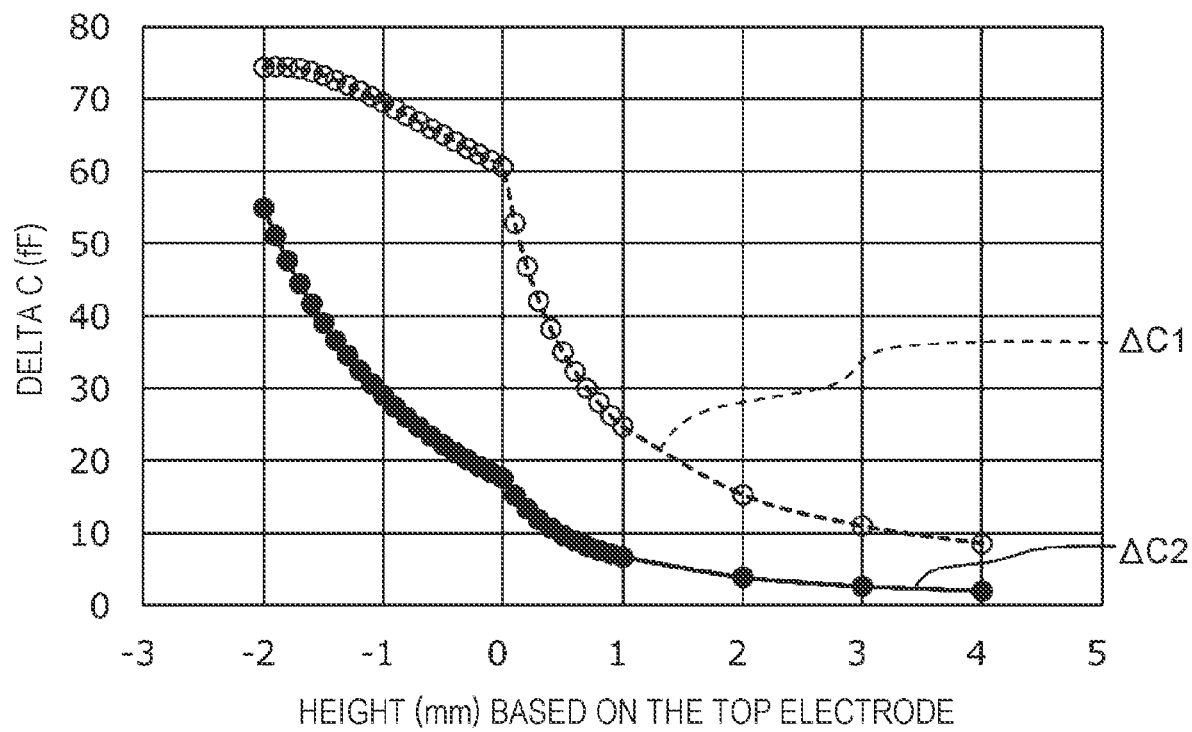
FIG. 9A is a graph of the relationship between a height of an operating body relative to an upper surface of the third electrode arrays and a change amount of capacitance.
Figure 9B:
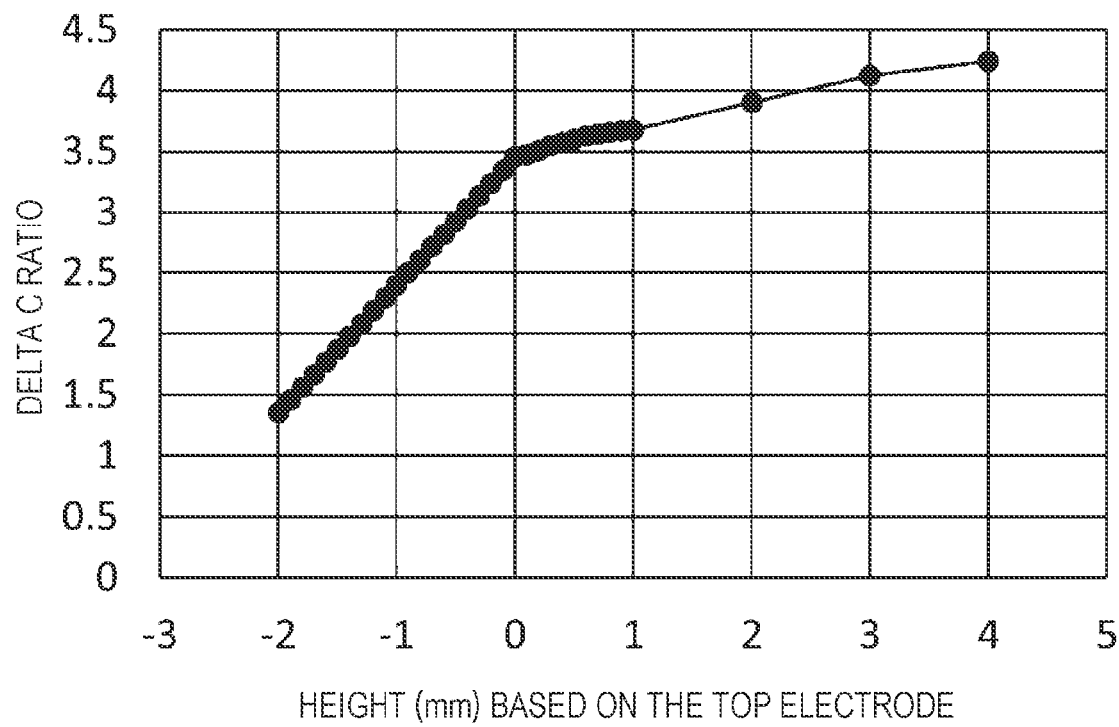
FIG. 9B is a graph of the relationship between a height of the operating body relative to the upper surface of the third electrode arrays and a ratio of a change amount of capacitance.

FIG. 8 is a sectional view of a configuration of a capacitive input device 310 according to a second embodiment. The capacitive input device 310 of the second embodiment has the same components as the first embodiment except that an elastic layer 331 and a protection layer 336 are disposed instead of the elastic protection layer 31 of the first embodiment. Components the same as those in the first embodiment are denoted by the same reference numerals. FIG. 8 is a sectional view in a position corresponding to FIG. 3. FIG. 9A is a graph of the relationship between a height of an operating body relative to an upper surface of third electrode arrays (an axis of abscissae) and a change amount of capacitance (an axis of ordinates), and FIG. 9B is a graph of the relationship between a height of the operating body relative to the upper surface of the third electrode arrays (an axis of abscissae) and a ratio of a change amount of capacitance (an axis of ordinates). Also in the second embodiment, as with the first embodiment, electrostatic capacitances are formed between individual first electrode arrays L11 to L15 and individual second electrode arrays L21 to L26. The electrostatic capacitances are changed when electrostatic capacitances formed between an operating body and reception electrodes are coupled by causing the operating body to move close to an operation plane or to move away from the operation plane. A position of the operating body in height in a normal direction of the operation plane is detected based on an amount of the change and position detection in the operation plane (an XY plane) is performed based on a position where the change in electrostatic capacitance occurs.

As illustrated in FIG. 8, in the capacitive input device 310 of the second embodiment, an elastic layer 331 (an elastic deforming layer), a third electrode array L332 disposed on a substrate 320a, and a protection layer 336 are disposed and formed on a panel body 33 in this order toward an upper side. Although not illustrated, in the second embodiment, six third electrode arrays having the same configuration as the third electrode arrays L31 to L36 of the first embodiment extend in the X1-X2 direction, and the third electrode array L332 illustrated in FIG. 8 corresponds to the third electrode array L32 of the first embodiment.

The protection layer 336 and the third electrode array L332 adhere to each other through a first adhesive layer 332a, the substrate 320a and the elastic layer 331 adhere to each other through a second adhesive layer 332b, and furthermore, the elastic layer 331 and the panel body 33 adhere to each other through a third adhesive layer 332c. The capacitive sensor section 20 and the panel body 33 have the same configuration as those of the first embodiment and adhere to each other through a third adhesive layer 32c. The elastic layer 331 is disposed between the third electrode array L332 and both the first electrode arrays L11 to L15 and the second electrode arrays L21 to L26.

The elastic layer 331, the substrate 320a, and the three adhesive layers 332a to 332c are configured by the same material as the elastic protection layer 31, the substrate 20a, and the three adhesive layers 32a to 32c, respectively. A thickness of the elastic layer 331 is set in accordance with pressure estimated by the capacitive input device 310.

The protection layer 336 is configured by non-conductive material having rigidity, and examples of the material include polycarbonate resin, polymethyl methacrylate resin, other acrylic resins, and glass.

Here, sizes of the individual layers are set as follows.
Protection layer 336: a thickness of 0.5 mm;
First adhesive layer 332a: a thickness of 0.1 mm;
Third electrode arrays: a width of 0.20 mm in a Y1-Y2 direction and a thickness of 20 nm;
Substrate 320a: a thickness of 0.05 mm;
Second adhesive layer 332b: a thickness of 0.1 mm;
Elastic layer 331: a thickness of 2.5 mm;
Third adhesive layer 332c: a thickness of 0.1 mm;
Panel body 33: a thickness of 3.00 mm;
Third adhesive layer 32c: a thickness of 0.175 mm (max);
First electrode arrays L11 to L15: a diagonal length of 6.20 mm (lengths in the X1-X2 direction and the Y1-Y2 direction) and a thickness of 20 nm;
Second electrode arrays L21 to L26: a diagonal length of 6.20 mm (lengths in the X1-X2 direction and the Y1-Y2 direction) and a thickness of 20 nm;
Substrate 20b: a thickness of 0.05 mm.

With this configuration, when downward pressure is applied to an upper surface 336a of the protection layer 336 serving as the operation plane, elastic deformation occurs such that the elastic layer 331 contracts downward. Therefore, as illustrated in FIGS. 9A and 9B, the operating body reaches a negative region of the axis of abscissae that is lower than a position before the pressing operation is performed.

As illustrated in FIG. 9A, change amounts $\Delta C1$ and $\Delta C2$ of capacitance are differently changed relative to a distance (an axis of abscissae (a unit of mm) of FIG. 9A) of the operating body to an upper surface of the third electrode arrays (Height Based on the top electrode). Furthermore, a ratio $\Delta C1/\Delta C2$ of the $\Delta C1$ and $\Delta C2$ has the linear relationship in the negative region and a positive region of the axis of abscissae as illustrated in FIG. 9B. Therefore, the ratio is reduced as the distance of the operating body to the operation plane is reduced, and this tendency is the same in the negative region. Here, in FIG. 9A, the change amount $\Delta C1$ is represented by a dotted line including white circles and the change amount $\Delta C2$ is represented by a solid line including black circles.

Accordingly, in any of a state in which the operating body is not in contact with the operation plane, a state in which the operating body is in contact with the operation plane, and a state in which pressure is applied to the operation plane, a height position (a position in the normal direction relative to the operation plane) from the operation plane in the Z1-Z2 direction (a position in the normal direction relative to the operation plane) may be reliably detected based on the straight line. Use of the ratio $\Delta C1/\Delta C2$ enables elimination of influence of a size of an area of the operating body in a plane direction of the operation plane, and accordingly, an absolute value of a position in height from the operation plane (a position in the normal direction relative to the operation plane) may be accurately calculated. Furthermore, in addition to a corresponding position (in-plane position) in the operation plane in the capacitive sensor section 20, an absolute position of a three-dimensional coordinate relative to the operation plane may be accurately calculated.

Although the present invention is described with reference to the foregoing embodiments, the present invention is not limited to the foregoing embodiments and may be altered or modified within the object of improvement or the scope of the invention.

As described above, the input device according to the present invention is effective in that information on an absolute position in a normal direction relative to an operation plane may be reliably detected irrespective of a size of a contact area when an operator brings an operating body, such as a finger, close to or into contact with the operation plane.

What is claimed is:
1. An input device comprising:
an operation plane on which an operating body is operated, the operation plane having a first direction and a second direction intersecting with the first directions;

a plurality of first electrode arrays each extending in the first direction and separated from one another with intervals interposed therebetween;

a plurality of second electrode arrays each extending in the second direction and separated from one another with intervals interposed therebetween;

a plurality of third electrode arrays each extending in the second direction and separated from one another with intervals interposed therebetween the plurality of third electrode arrays being arranged closer to the operation plane relative to the plurality of second electrode array in a normal direction normal to the operation plane, wherein, viewed from the normal direction, each second electrode array has respective protruding portions protruding from a boundary of the third electrode array correspond to the second electrode array; and a controller configured to set the plurality of first electrode arrays as driving electrodes, while setting both of the plurality of second electrode arrays and the plurality of third electrode arrays as reception electrodes, and to set the plurality of first electrode arrays as reception electrodes, while setting both of the plurality of second electrode arrays and the plurality of third electrode arrays as driving electrodes, wherein, when a first change amount of electrostatic capacitance between the plurality of first electrode arrays and the plurality of third electrode arrays occurred by an operation of the operating body is denoted by $\Delta C1$, and a second change amount of electrostatic capacitance between the plurality of first electrode arrays and the plurality of second electrode arrays occurred by an operation of the operating body is denoted by $\Delta C2$, the controller is further configured to calculate a position of the operating body in the normal direction relative to the operation plane based on a ratio $\Delta C1/\Delta C2$ of the first change amount $\Delta C1$ and the second change amount $\Delta C2$.

2. The input device according to claim 1, wherein the ratio $\Delta C1/\Delta C2$ becomes smaller as a distance of the operating body to the operation plane reduces.

3. The input device according to claim 1, wherein the plurality of second electrode arrays are arranged closer to the plurality of first electrode arrays relative to the plurality of third electrode arrays in the normal direction.

4. The input device according to claim 1, wherein the plurality of second electrode arrays and the plurality of third electrode arrays have a same arrangement pitch in the first direction.

5. The input device according to claim 1, wherein a center of gravity of the second electrode array and a center of gravity of the corresponding third electrode array coincide with each other in the first direction.

6. The input device according to claim 1, further comprising:
an elastic deformation layer formed between the operation plane and the plurality of third electrode arrays in the normal direction.

7. The input device according to claim 1, further comprising:
an elastic deformation layer formed between the plurality of third electrode arrays and the plurality of second electrode arrays in the normal direction.

8. The input device according to claim 1, wherein the controller is further configured to calculate, when a pressing operation is performed using the operating body on the operation plane, a distance of the operating body from the operation plane in the normal direction and a corresponding location of the operating body in the operation plane.

9. The input device according to claim 1, wherein the controller is further configured to calculate, when the operating body moves away from the operation plane, a distance of the operating body from the operation plane in the normal direction and a corresponding location of the operating body in the operation plane.

10. The input device according to claim 1, wherein an in-plane position of the operating body in the operation plane is detected based on electrostatic capacitances generated between the plurality of first electrode arrays and the plurality of second electrode arrays.

11. A method for detecting a position of an operation body operated on an operation plane of an input device, the operation plane having a first direction and a second direction intersecting with the first direction, the input device including a plurality of first electrode arrays each extending in the first direction and separated from one another with intervals interposed therebetween, a plurality of second electrode arrays each extending in the second direction and separated from one another with intervals interposed therebetween, a plurality of third electrode arrays each extending in the second direction and separated from one another with intervals interposed therebetween, the plurality of third electrode arrays being arranged closer to the operation plane relative to the plurality of second electrode array in a normal direction normal to the operation plane, wherein, viewed from the normal direction, each second electrode array has respective protruding portions protruding from a boundary of the third electrode array correspond to the second electrode array, the method comprising:

setting the plurality of first electrode arrays as driving electrodes, while setting both of the plurality of second electrode arrays and the plurality of third electrode arrays as reception electrodes;

setting the plurality of first electrode arrays as reception electrodes, while setting both of the plurality of second electrode arrays and the plurality of third electrode arrays as driving electrodes;

detecting a first change amount of electrostatic capacitance between the plurality of first electrode arrays and the plurality of third electrode arrays occurred by an operation of the operating body, which is denoted by $\Delta C1$;

detecting a second change amount of electrostatic capacitance between the plurality of first electrode arrays and the plurality of second electrode arrays occurred by an operation of the operating body, which is denoted by $\Delta C2$; and calculating a position of the operating body in the normal direction relative to the operation plane based on a ratio $\Delta C1/\Delta C2$ of the first change amount $\Delta C1$ and the second change amount $\Delta C2$.

12. The method according to claim 11, wherein the ratio $\Delta C1/\Delta C2$ becomes smaller as a distance of the operating body to the operation plane reduces.

13. The method according to claim 11, further comprising:
calculating, when a pressing operation is performed using the operating body on the operation plane, a distance of the operating body from the operation plane in the normal direction and a corresponding location of the operating body in the operation plane.

14. The method according to claim 11, further comprising:
   calculating, when the operating body moves away from the operation plane, a distance of the operating body from the operation plane in the normal direction and a corresponding location of the operating body in the operation plane.

15. The method according to claim 11, further comprising:
   detecting an in-plane position of the operating body in the operation plane based on electrostatic capacitances generated between the plurality of first electrode arrays and the plurality of second electrode arrays.

* * * * *